United States Patent
Olson et al.

(10) Patent No.: US 12,352,323 B1
(45) Date of Patent: Jul. 8, 2025

(54) SPRAG CLUTCH SYSTEM FOR ROTORCRAFT

(71) Applicant: Bell Textron Inc., Fort Worth, TX (US)

(72) Inventors: Eric Olson, Fort Worth, TX (US);
Mark Przybyla, Keller, TX (US);
Jacob Speed, Cullman, AL (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/742,123

(22) Filed: Jun. 13, 2024

(51) Int. Cl.
*F16H 1/28* (2006.01)
*B64D 35/00* (2006.01)
*F16D 41/07* (2006.01)
*B64C 29/00* (2006.01)
*F16D 41/06* (2006.01)

(52) U.S. Cl.
CPC ............. *F16D 41/07* (2013.01); *B64D 35/00* (2013.01); *B64C 29/0033* (2013.01); *F16D 2041/0603* (2013.01)

(58) Field of Classification Search
CPC . F16D 41/07; F16D 2041/0603; B64D 35/00; B64C 29/0033
See application file for complete search history.

(56) References Cited

U.S. PATENT DOCUMENTS

| | | | | |
|---|---|---|---|---|
| 5,139,123 A | * | 8/1992 | Rutke | F16D 41/07 |
| | | | | 192/113.1 |
| 5,722,522 A | * | 3/1998 | Henry | F16D 41/07 |
| | | | | 188/82.8 |
| 2003/0183473 A1 | * | 10/2003 | Jensen | F16D 43/14 |
| | | | | 192/105 R |
| 2013/0098732 A1 | * | 4/2013 | Ehinger | F16D 41/06 |
| | | | | 192/41 R |
| 2017/0045100 A1 | * | 2/2017 | Tsai | B60B 27/023 |
| 2018/0163795 A1 | * | 6/2018 | Olson | F16H 57/0025 |
| 2020/0240480 A1 | * | 7/2020 | Hodge | F16D 41/16 |
| 2021/0348658 A1 | * | 11/2021 | Cioc | F16D 41/04 |
| 2023/0313849 A1 | * | 10/2023 | Stabel | F16D 41/084 |
| | | | | 192/41 A |

* cited by examiner

*Primary Examiner* — Farhana Pervin
(74) *Attorney, Agent, or Firm* — Slater Matsil, LLP

(57) ABSTRACT

A rotorcraft includes a drive shaft coupled to an engine; a sprag clutch coupled the drive shaft; and an output shaft coupled to the sprag clutch, wherein the sprag clutch physically contacts a first contact surface of the output shaft during operation, wherein a first cross-sectional thickness of the output shaft near the middle of the first contact surface is greater than a second cross-sectional thickness of the output shaft near a first edge of the first contact surface.

20 Claims, 10 Drawing Sheets

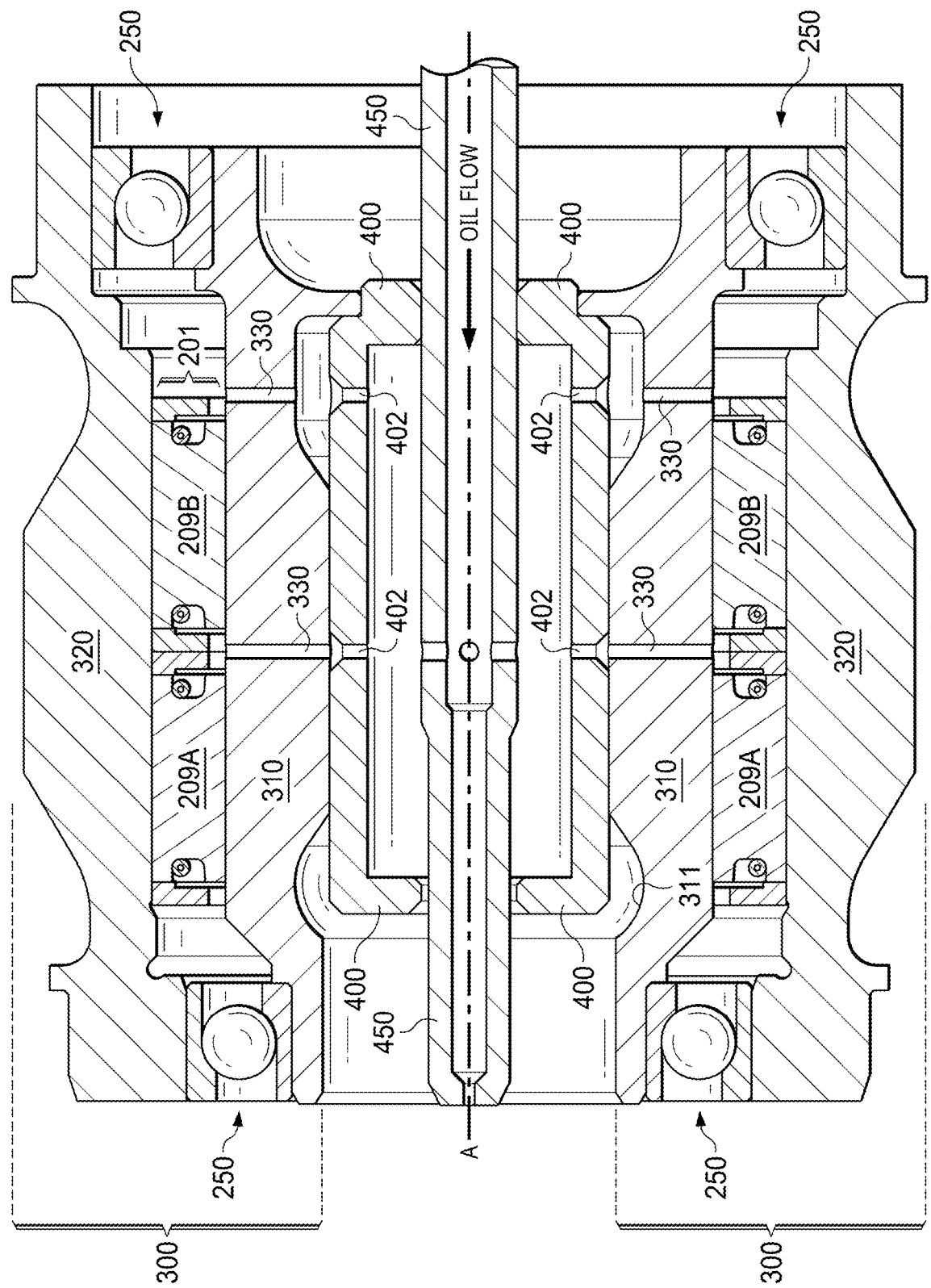

SPRAG CLUTCH SYSTEM FOR ROTORCRAFT

GOVERNMENT RIGHTS

This invention was made with U.S. Government support under Agreement No. N00019-22-G-0002 awarded by the Army Contracting Command-Redstone Arsenal. The Government has certain rights in the invention.

TECHNICAL FIELD

The present invention relates generally to a sprag clutch and a drive system of a rotorcraft.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of systems such as mechanical systems, electrical systems, hydraulic systems, and the like, are each subject to unique wear factors and monitoring, inspection or maintenance requirements. Accordingly, improvements to the safety and reliability of these systems and other rotorcraft systems are desirable.

SUMMARY

In some embodiments, a rotorcraft includes a drive shaft coupled to an engine; a sprag clutch coupled the drive shaft; and an output shaft coupled to the sprag clutch, wherein the sprag clutch physically contacts a first contact surface of the output shaft during operation, wherein a first cross-sectional thickness of the output shaft near the middle of the first contact surface is greater than a second cross-sectional thickness of the output shaft near a first edge of the first contact surface. In an embodiment, the first cross-sectional thickness of the output shaft near the middle of the first contact surface is greater than a third cross-sectional thickness of the output shaft near a second edge of the first contact surface that is opposite the first edge. In an embodiment, the sprag clutch physically contacts a second contact surface of the drive shaft during operation, wherein a fourth cross-sectional thickness of the drive shaft near the middle of the second contact surface is greater than a fifth cross-sectional thickness of the drive shaft near a first edge of the second contact surface. In an embodiment, a portion of the output shaft that includes the middle of the first contact surface has a constant cross-sectional thickness. In an embodiment, the sprag clutch includes first sprags distributed around a first retainer and second sprags distributed around a second retainer. In an embodiment, the first contact surface is longitudinally flat, wherein a surface of the output shaft opposite the first contact surface is longitudinally curved. In an embodiment, the longitudinal variation of mechanical stiffness across the first contact surface is less than 10%. In an embodiment, the second cross-sectional thickness is between 20% and 90% of the first cross-sectional thickness.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 illustrates a portion of a sprag clutch system with an oil distribution tube, in accordance with some embodiments.

DETAILED DESCRIPTION OF ILLUSTRATIVE EMBODIMENTS

Figure 1:
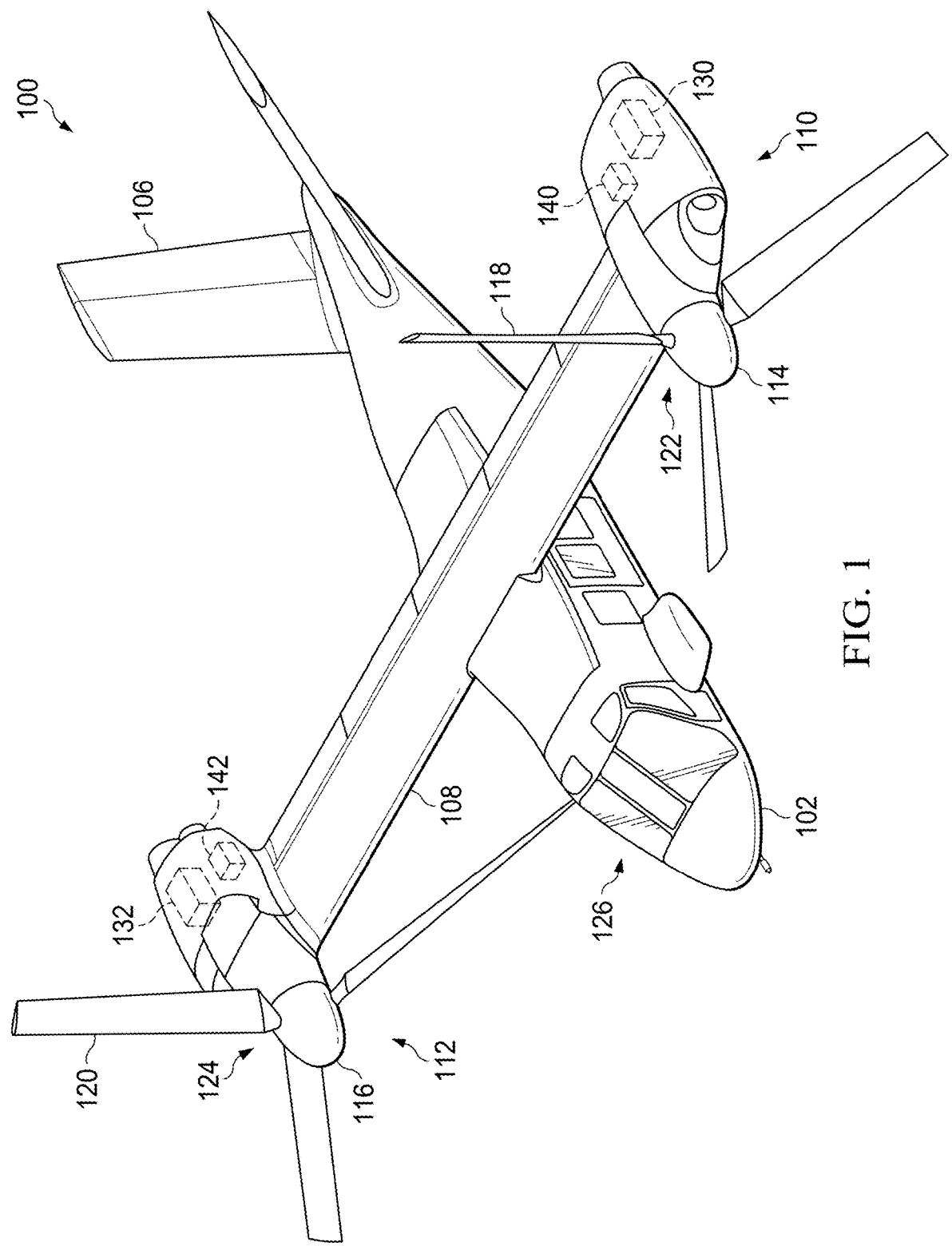
FIG. 1 illustrates a rotorcraft, in accordance with some embodiments.

Representative embodiments of systems and methods of the present disclosure are described below. In the interest of clarity, features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to spatial relationships between various components and to spatial orientation of various aspects or components of devices illustrated in the attached drawings. However, as will be recognized by those skilled in the art, the devices, members, apparatuses, etc., described herein may be positioned in any desired orientation. Thus, the use of terms such as "above," "below," "upper," "lower," or other contextually similar terms to describe a spatial relationship between various components, or to describe spatial orientation of aspects of such components, should be understood to describe a relative relationship between the components, or a spatial orientation of aspects of such components, respectively, as devices described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Some aircraft, such as rotorcraft, have one or more sprag clutches (e.g., freewheeling clutches, overrunning clutches, or the like). A sprag clutch transmits torque in one rotational direction (e.g., the "engaged direction") but does not transmit torque in the opposite rotational direction (e.g., the "reverse direction"). As an example, a sprag clutch system may comprise a rotating inner element and a rotating outer element configured to rotate about the same axis. When the rotational speed of the inner element is greater than the rotational speed of the outer element, the sprag clutch is in an "overrunning" condition (e.g., a "freewheeling" condition) in which the inner element and outer element rotate independently, and no torque is transferred between the inner element and the outer element. In some cases, when the rotational speed of the outer element is the same as (or greater than) the rotational speed of the inner element, the clutch engages and the inner element and outer element rotate together, as if a single rotating element.

Sprag clutches may have various utilizations within a rotorcraft. As an example, the power generated by an engine of a rotorcraft may be coupled to other components (e.g., a proprotor, an accessory gearbox, etc.) through a sprag clutch in a gearbox. Under typical operation, sprag clutches connect the engine to the rotor through the rotorcraft's transmission and ensure torque transmission to the hub. Following engine failures, these devices disengage to allow the rotor system to maintain higher rotation speeds than the engine. This allows optimal autorotation performance and does not back drive the engine in the event of engine damage. As another example, a sprag clutch may couple a starter to an engine to allow the starter to be decoupled once the engine reaches sufficient speed. As another example, the engines of a multi-engine rotorcraft may be coupled by an overrunning clutch to control torque transfer between engines. Sprag clutches also allow single engine startup in multi-engine rotorcraft without driving the other engine(s). For example, a first engine may be started before a second engine, with the sprag clutch remaining in an overrunning condition until the rotational speed of the second engine reaches that of the first, at which point the clutch engages and the engines are coupled. As another example, a sprag clutch may couple the engine(s) to the rotor in order to allow autorotation of the rotor during engine failure. Other example utilizations are possible.

Embodiments presented herein are directed to a sprag clutch system for a rotorcraft having improved efficiency and reliability. The sprag clutch system described herein allows for more uniform stress imparted by the sprags of a sprag clutch on the inner and outer elements when the sprags are engaged. Embodiments described herein allow for a robust design that can reduce wear, reduce stress, reduce the probability of failure modes, or improve operation of the sprag clutch. The embodiments herein may be applied to a variety of rotorcraft, such as helicopters, tiltrotor aircraft, manned rotorcraft, unmanned rotorcraft, multi-engine rotorcraft, multi-rotor rotorcraft, or the like. These are examples, and other rotorcraft or rotorcraft systems are possible.

In some embodiments, the rotorcraft may include a FBW system to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like. The FCCs may provide these functions according to control laws (CLAWS). In some embodiments, multiple FCCs are provided for redundancy. One or more modules within the FCCs may be partially or wholly embodied as software and/or hardware for performing any functionality described herein.

FIG. 1 illustrates a rotorcraft 100 according to some embodiments. The rotorcraft 100 includes a left rotor system 110 and a right rotor system 112, which are part of the drive system of the tiltrotor aircraft 100. The left rotor system 110 includes a left engine 130 that provides power to a left proprotor 114. The power of the left engine 130 is coupled to the left proprotor 114 through a left gearbox 140. The rotorcraft 100 may comprise other gearboxes coupled to the left gearbox 140. The left gearbox 140 may comprise a sprag clutch system, which may be similar to the sprag clutch system 300 described in greater detail below, in some embodiments. The left proprotor 114 comprises a plurality of rotor blades, and a single rotor blade 118 is labeled in FIG. 1. Right rotor system 112 includes a right engine 132 that provides power to a right proprotor 116 through a right gearbox 142. The right gearbox 142 also comprises a sprag clutch system, which may be similar to the sprag clutch system 300 described in greater detail below, in some embodiments. The rotorcraft 100 may comprise other gearboxes coupled to the right gearbox 142. The right proprotor comprises a plurality of rotor blades 120, and a single rotor blade 120 is labeled in FIG. 1. A sprag clutch system similar to those described herein may be utilized in other locations of the drive system or may be utilized by other systems within the rotorcraft 100.

The engines 130/132 of the left rotor system 110 and the right rotor system 112 may be controlled according to signals from the FBW system. The pitch of the left rotor blades 118 may be controlled by a left swashplate 122, and the pitch of the right rotor blades 120 may be controlled by a right swashplate 124. The left swashplate 122 and the right swashplate 124 selectively control the attitude, altitude, and movement of the rotorcraft 100. The left and right swashplates 122/124 may be used to collectively or cyclically change the pitch of the rotor blades 118/120 respectively. The position and orientation of each swashplate 122/124 is changed by one or more actuators (not shown in FIG. 1). In some embodiments, the FBW system sends electrical signals to the swashplate actuators to control flight of rotorcraft 100.

Rotorcraft 100 further includes a wing 108, a fuselage 102, and a tail section 106. The tail section 106 may have other flight control devices such as horizontal or vertical stabilizers, rudder, elevators, or other control or stabilizing surfaces that are used to control or stabilize flight of the rotorcraft 100, which may include differing platform stability considerations depending on the applied configuration. The fuselage 102 includes a cockpit 126, which includes displays, controls, instruments, and the like. It should be appreciated that even though the rotorcraft 100 is depicted as having certain illustrated features, the rotorcraft 100 may have a variety of implementation-specific configurations. For instance, in some embodiments, the cockpit 126 may be configured to accommodate a pilot or a pilot and co-pilot. It is also contemplated, however, that the rotorcraft 100 may be operated remotely, in which case the cockpit 126 could be configured as a fully functioning cockpit to accommodate a pilot (and possibly a co-pilot as well) to provide for greater flexibility of use, or could be configured with a cockpit having limited functionality (e.g., a cockpit with accommodations for only one person functioning as the pilot, operating perhaps with a remote co-pilot, or as a co-pilot or back-up pilot with primary piloting functions being performed remotely). In yet other contemplated embodiments, the rotorcraft 100 could be configured as an unmanned vehicle, in which case the cockpit 126 could be eliminated entirely in order to save space and cost.

FIG. 1 illustrates the rotorcraft 100 in an airplane mode, in which proprotors 114 and 116 are positioned substantially horizontally to provide a forward thrust, in which a lifting force is supplied by wing 108. The rotorcraft 100 may also be operated in a helicopter mode (not separately illustrated), in which proprotors 114 and 116 are positioned more vertically to provide a lifting thrust. In this manner, the rotorcraft 100 may be considered a tiltrotor aircraft or the like. In some embodiments of the rotorcraft 100, the entire rotor systems 110/112 are repositioned to transition between airplane mode and helicopter mode, and in other embodiments of the rotorcraft 100, only the proprotors 114/116 are repositioned to transition between airplane mode and helicopter mode. It should be appreciated that tiltrotor aircraft can be operated such that proprotors 114 and 116 are selectively positioned between airplane mode and helicopter mode, which can be referred to as a conversion mode. This is an example, and it should be appreciated that the sprag clutch systems described herein may be utilized in any suitable type of rotorcraft.

Figure 2:
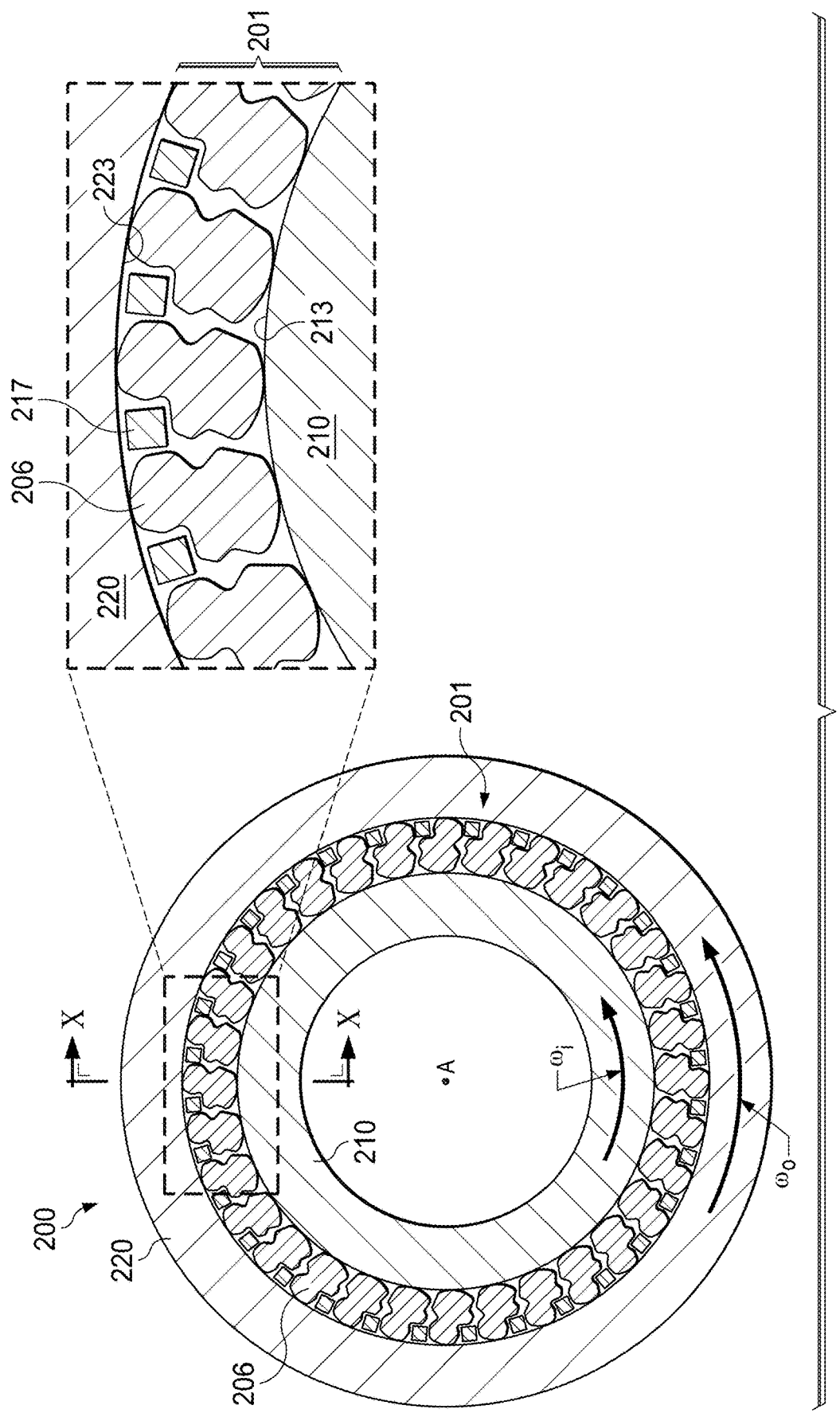
FIG. 2 illustrates a sprag clutch system, in accordance with some embodiments.

Turning to FIG. 2, a cross-sectional schematic of a sprag clutch system 200 is shown. The cross-sectional view shown in FIG. 2 is a radial (e.g., transverse) cross-sectional view of a sprag clutch system 200, and a magnified portion of the sprag clutch system 200 is also shown. The sprag clutch system 200 shown in FIG. 2 comprises an inner race 210, an outer race 220, and a sprag clutch 201 between the inner race 210 and the outer race 220. The inner race 210 and the outer race 220 may be independently attached to rotating components such as shafts, gears, or the like. The inner race 210 may also be called an "inner race" or "inner raceway" and the outer race 220 may also be called an "outer race" or "outer raceway." The inner race 210 and outer race 220 rotate about the same longitudinal axis A.

The sprag clutch 201 comprises a plurality of sprags 206 held by a retainer 217. In some embodiments, a sprag clutch 201 may comprise other components, such as springs or bearings. In some embodiments, a sprag clutch 201 has a single row of sprags 206. In other embodiments, a sprag clutch 201 has two or more rows of sprags 206, such as the embodiment described below for FIG. 2. The sprags 206 are movable elements between the inner race 210 and the outer race 220 that are held by a retainer 217. The sprags 206 allow the outer race 220 to rotate relative to the inner race 210 in one direction but not the opposite direction. For example, when the rotational speed $\omega_i$ of the inner race 210 is equal to the rotational speed $\omega_o$ of the outer race 220, the sprags 206 wedge against a contact surface 213 of the inner race 210 and a contact surface 223 of the outer race 220. This allows torque to be transferred between the inner race 210 and the outer race 220. In this manner, the inner race 210 and the outer race 220 may be driven at the same rotational speed. When the rotational speed $\omega_o$ of the outer race 220 is less than the rotational speed $\omega_i$ of the inner race 210, the sprags 206 disengage with the contact surface 213 of the inner race 210 and allow the inner race 210 to independently rotate (e.g., "overrun" or "freewheel") with respect to the outer race 220.

Figure 3:
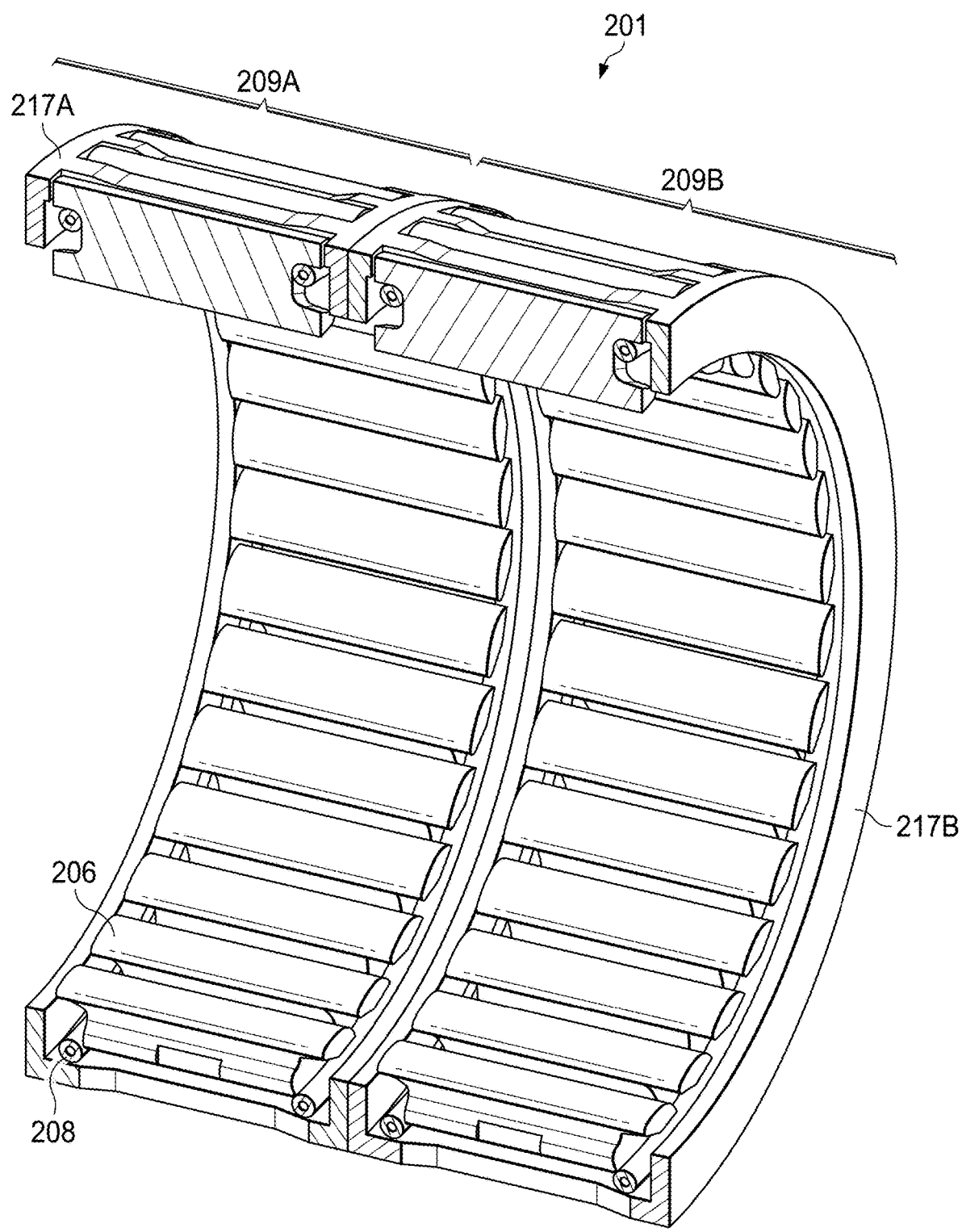
FIG. 3 illustrates a portion of a sprag clutch, in accordance with some embodiments.

FIG. 3 illustrates a three-dimensional view of a portion of a sprag clutch 201, in accordance with some embodiments. The sprag clutch 201 shown in FIG. 3 may be similar to the sprag clutch 201 described previously for FIG. 2. As shown in FIG. 3, the sprag clutch 201 comprises two sets 209A-B of sprags 206. One set 209A comprises sprags 206 held by a retainer 217A, and another set 209B comprises sprags 206 held by a retainer 217B. The retainers 217A and 217B are free to move with respect to each other, in some embodiments. In some embodiments, energizing springs 208 load the sprags 206 to ensure the sprags 206 make constant contact with the inner race 210 (e.g., at contact surface 213) and the outer race 220 (e.g. at contact surface 223). In some cases, a set 209 of sprags 206 may be referred to as a "row" of sprags 206. In some cases, the use of a sprag clutch 201 comprising multiple sets 209 of sprags 206 can improve load distribution, reduce stress, reduce sprag wear, and improve reliability. The sprag clutch 201 in FIG. 3 is an example shown for illustrative purposes, and other configurations of sprag clutches, overrunning clutches, or the like are possible and considered within the scope of the present disclosure. The embodiments of sprag clutch systems described herein may be used with any suitable types or configurations of sprag clutches.

Figure 4:
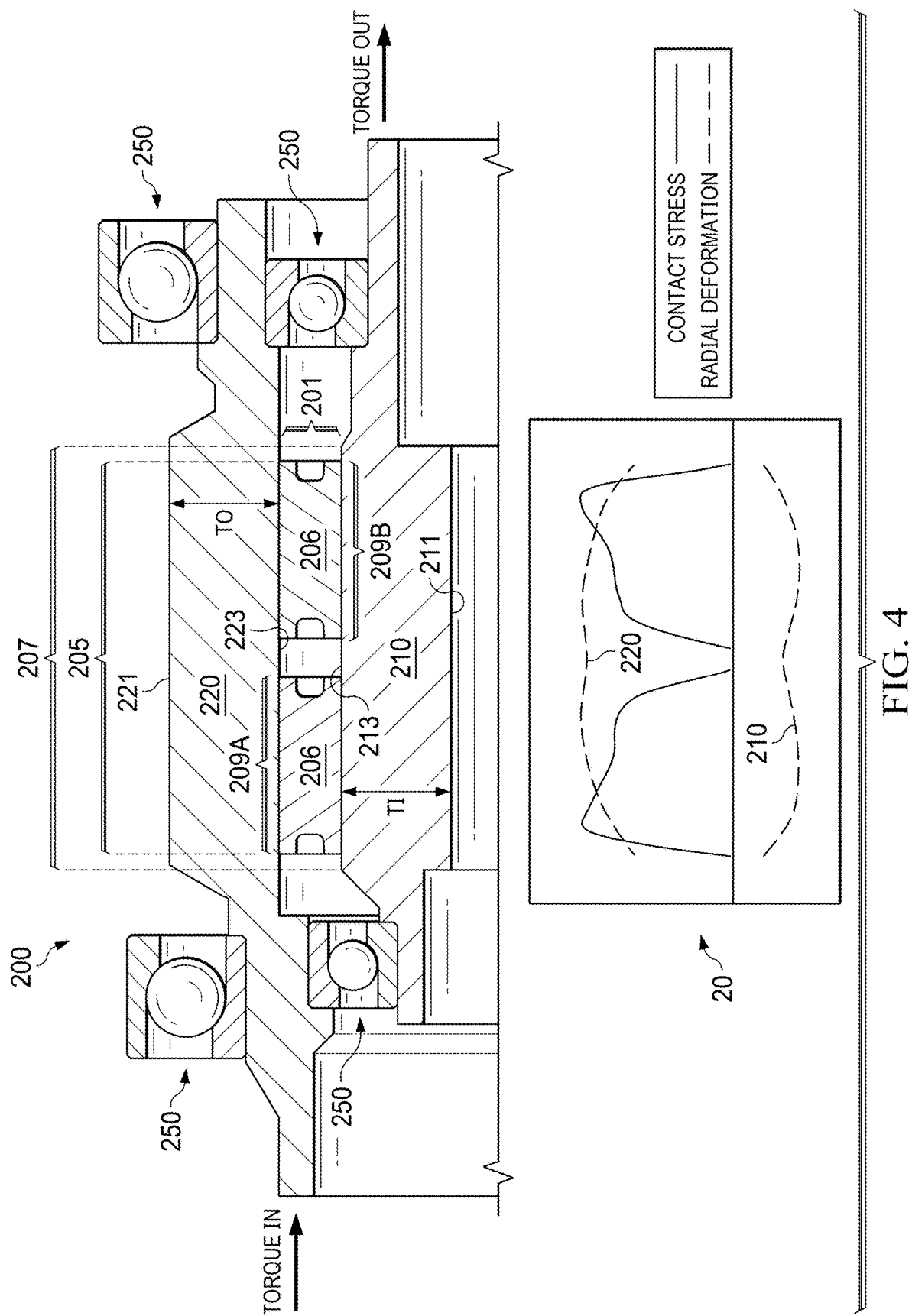
FIG. 4 illustrates a portion of a sprag clutch system, in accordance with some embodiments.

FIG. 4 illustrates a cross-sectional view of a portion of an example sprag clutch system 200. The sprag clutch system 200 shown in FIG. 4 may be similar to the sprag clutch system 200 shown in FIG. 2, for example. The cross-sectional view of FIG. 4 may correspond to the longitudinal cross-section X-X indicated in FIG. 2. The sprag clutch system 200 of FIG. 4 comprises a sprag clutch 201, which may be similar to the sprag clutches 201 described for FIG. 2 or 3. For example, the sprag clutch 201 of FIG. 4 comprises two sets 209A-B of sprags. Some features of a sprag clutch 201, such as the retainers 217A-B, are not illustrated in FIG. 4 and some subsequent figures. The sprag clutch system 200 comprises an outer race 220 supported by a plurality of bearings 250 and an inner race 210 supported by a plurality of bearings 250. The bearings 250 are representative, and a sprag clutch system 200 may have another arrangement or configuration of bearings 250. In the example sprag clutch system 200 of FIG. 4, torque from the outer race 220 is transferred to the inner race 210 by the sprag clutch 201.

FIG. 4 indicates a race region 207 of the sprag clutch system 200, which represents a cross-section of the approximate portions of the inner race 210 and outer race 220 that are within the sprag clutch system 200. FIG. 4 also indicates a sprag contact region 205 of the sprag clutch system 200. The sprag contact region 205 represents the cross-sectional region of the sprag clutch system 200 within which the sprags 206 physically contact the contact surface 213 of the inner race 210 and/or the contact surface 223 of the outer race 220 during operation. As shown in FIG. 4, the sprag contact region 205 includes the portion of the outer race 220 overlapping the sprags 206 and the portion of the inner race 210 overlapping the sprags 206. In some cases, the sprag contact region 205 extends from one side of the sprags 206 of the set 209A to the far side of the sprags 206 of the set 209B. As shown in FIG. 4, the sprag contact region 205 is within the race region 207. In some cases, the race region 205 and the sprag contact region 205 coincide or approximately coincide. It should be noted that the race region 207 and the sprag contact region 205 may extend cylindrically within the full sprag clutch system 200.

In the sprag clutch system 200 of FIG. 4, the thickness TI of the inner race 210 is substantially constant within the sprag contact region 205, and the thickness TO of the outer race 220 is substantially constant within the sprag contact region 205. In other words, the contact surfaces 213 and 223 and the opposite surfaces 211 and 221 are all substantially parallel within the same longitudinal cross-section of the sprag contact region 205. Accordingly, the surfaces 211, 213, 221, and 223 may be considered "flat" surfaces. In some cases, the thicknesses TI and/or TO may be greater than adjacent regions of the inner race 210 and/or outer race 220 that are outside of the sprag contact region 205.

In some cases, the portion of the inner race 210 having the same thickness TI may extend outside of the sprag contact region 205. In some cases, the portion of the inner race 210 having the same thickness TI may correspond approximately to the race region 207. In some cases, the portion of the inner race 210 having the same thickness TI may extend outside of the race region 207. In some cases, the portion of the outer race 220 having the same thickness TO may extend outside of the sprag contact region 205. In some cases, the portion of the outer race 220 having the same thickness TO may correspond approximately to the race region 207. In some cases, the portion of the outer race 220 having the same thickness TO may extend outside of the race region 207. In some cases, these thicknesses TI and/or TO may be greater than adjacent regions of the inner race 210 and/or outer race 220 that are outside of the race region 207.

During operation of the sprag clutch system 200, the wedging action of the sprags 206 imparts stresses on the inner race 210 and outer race 220 due to contact pressure. In some cases, the stresses imparted by the sprags 206 can extend both radially (e.g., vertically in FIG. 4) and longitudinally (e.g., horizontally in FIG. 4) into the inner race 210 and the outer race 220. In some cases, stresses including contact pressure from the sprags 206 can cause radial deformation of the inner race 210 and outer race 220 during operation. This is shown in the graph 20 of FIG. 4, which illustrates an example of radial deformation of the inner race 210 and the outer race 220 in the sprag contact region 205. The dashed lines in graph 20 represent the radial deformation distance (arbitrary units) of the inner race 210 and the outer race 220 during operation of the sprag clutch system 200. As shown in graph 20, the radial deformation may be greatest near the center of the sprag contact region 205 and smallest near the edges of the sprag contact region 205. In some cases, this uneven deformation across the sprag contact region 205 may be due to uneven mechanical stiffness of the inner race 210 and outer race 220 within the sprag contact region 205 and around the race region 207. For example, portions of the inner race 210 and outer race 220 near the edges of the sprag contact region 205 may have contributions to stiffness from the portions of the inner race 210 and outer race 220 outside of the sprag contact region 205. The stiffness of the portions of the inner race 210 and outer race 220 that extend longitudinally away from the sprag contact region 205 can thus reduce the deformation experienced near the edges of the sprag contact region 205. The portions of the inner race 210 and outer race 220 outside of the sprag contact region 205 contribute less stiffness to the center of the sprag contact region 205 than to the edges of the sprag contact region 205. Thus, this difference in stiffness between the center of the sprag contact region 205 and the edges of the sprag contact region 205 can result in increased radial deformation near the center of the sprag contact region 205. In some cases, the uneven radial deformation may be more pronounced for a sprag clutch system 200 that uses two or more sets 209 of sprags 206.

In some cases, the uneven radial deformation across the sprag contact region 205 can result in uneven contact stress across the sprag contact region 205. This is shown in the graph 20 of FIG. 4, which illustrates an example of contact stress of the inner race 210 in the sprag contact region 205. The solid lines in graph 20 represent the contact stress (arbitrary units) experienced by the inner race 210 during operation of the sprag clutch system 200. As shown in graph 20, uneven radial deformation can also result in uneven contact stress on the inner race 210 and/or outer race 220 from the sprags 206. More variation of the radial deformation across the sprag contact region 205 can result in more variation of contact stress across the sprag contact region 205. In some cases, the uneven contact stress may be more pronounced for a sprag clutch system 200 that uses two or more sets 209 of sprags 206. Uneven contact stress can result in greater wear and reduced reliability of a sprag clutch. In this manner, differences in stiffness across the sprag contact region 205 can result in deformations and stresses, which can reduce reliability, reduce safety, and decrease efficiency of operation.

Figure 5:
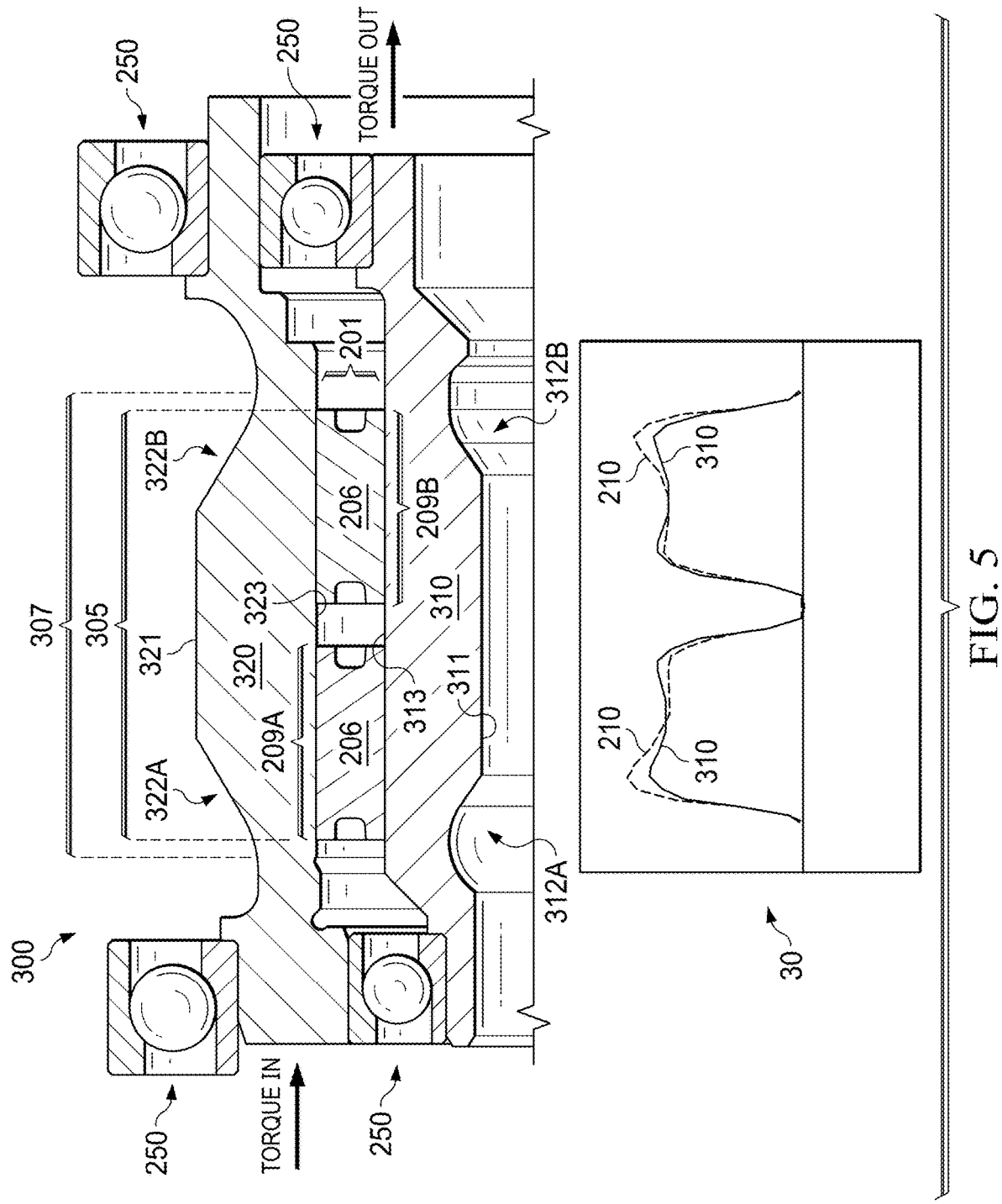
FIG. 5 illustrates a portion of a sprag clutch system, in accordance with some embodiments.

FIG. 5 illustrates a sprag clutch system 300, in accordance with some embodiments. The sprag clutch system 300 comprises a sprag clutch 201 between an inner race 310 and an outer race 320. The sprag clutch system 300 is similar to the sprag clutch system 200 described previously, except that the profiles of the inner race 310 and outer race 320 of the sprag clutch system 300 have been shaped to provide more even contact stress, described in greater detail below. The sprag clutch system 300 comprises a sprag clutch 201 similar to that described previously for FIGS. 2-4, such as a sprag clutch 201 comprising two sets 209A-B of sprags 206. FIG. 5 shows the sprag clutch system 300 in a view similar to that of FIG. 4, such as a cross-sectional view along cross-section X-X of FIG. 2.

The sprag clutch system 300 comprises an outer race 320 supported by a plurality of bearings 250 and an inner race 310 supported by a plurality of bearings 250. The bearings 250 are representative, and a sprag clutch system 300 may have another arrangement or configuration of bearings 250. In the example sprag clutch system 300 of FIG. 5, torque from the outer race 320 is transferred to the inner race 310 by the sprag clutch 201. The sprag clutch system 300 shown in FIG. 5 is an illustrative example, and the arrangement or configuration of the sprag clutch system 300, such as the profile shapes of the inner race 310 and/or the outer race 320, may be different than shown in other embodiments.

FIG. 5 also illustrates a sprag contact region 305 and a race region 307 of the sprag clutch system 300, in accordance with some embodiments. The sprag contact region 305 and the race region 307 may be similar to the sprag contact region 205 and race 207 described for FIG. 4. For example, the sprag contact region 305 corresponds to the region within which the sprags 206 physically contact the inner race 310 and/or the outer race 320 during operation, and the race region 307 approximately corresponds to the portions of the races 310/320 within the sprag clutch system 300. Accordingly, the sprag contact region 305 may be within the race region 307, as shown in FIG. 5. The inner race 310 has a contact surface 313 that the sprags 206 contact during operation and an opposite surface 311. The outer race 320 has a contact surface 323 that the sprags 206 contact during operation and an opposite surface 321. Similar to the sprag clutch system 200, the contact surfaces 313 and 323 of the sprag clutch system 300 are substantially flat within the sprag contact region 305, in some embodiments the contact surfaces 313 and 323 may be substantially flat within the race region 307. However, unlike the sprag clutch system 200, the opposite surface 311 and/or the opposite surface 321 of the sprag clutch system 300 may not be substantially flat within the sprag contact region 305.

Figure 7A:
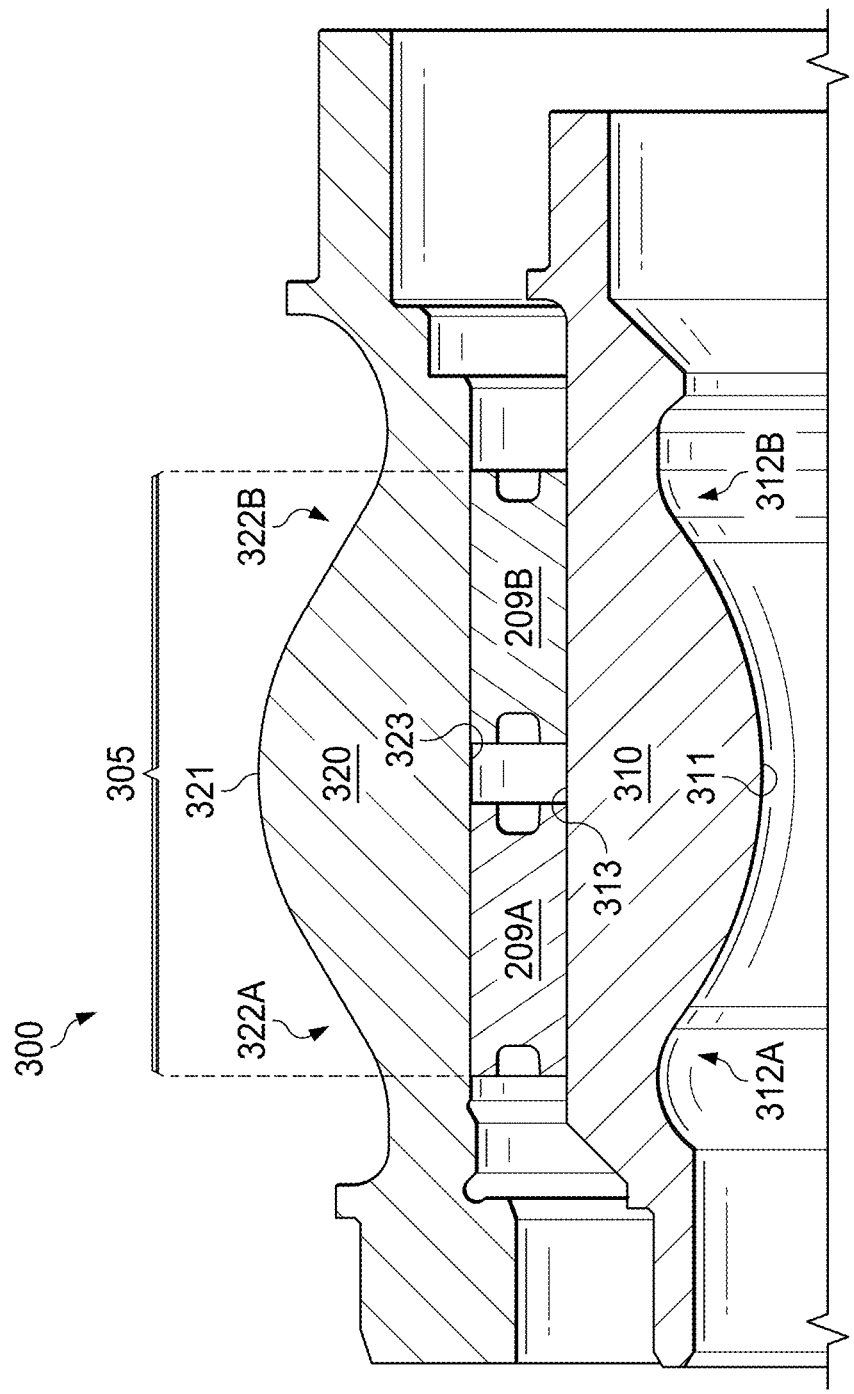
FIGS. 7A, 7B, and 7C illustrate sprag clutch systems, in accordance with some embodiments.
Figure 7B:
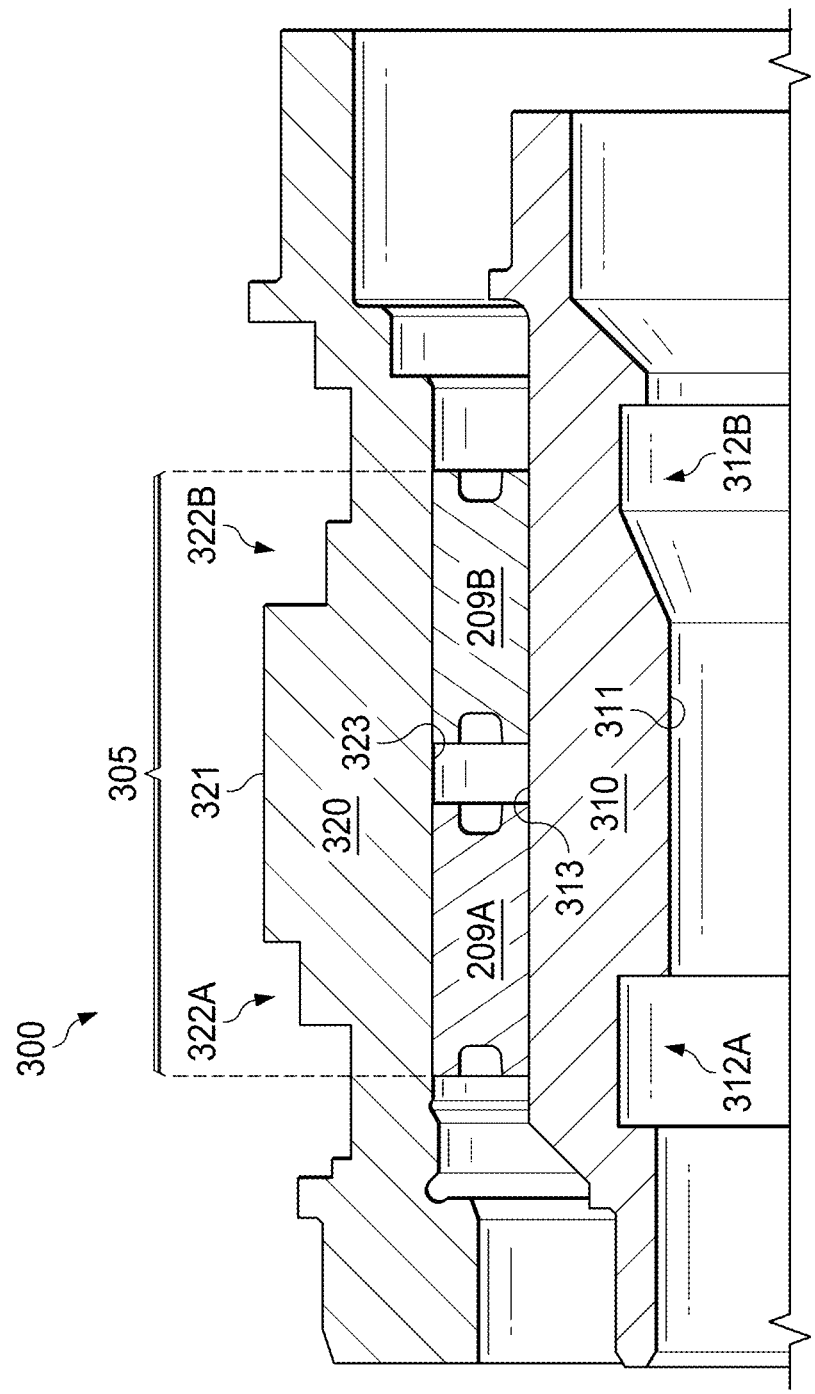
Figure 7C:
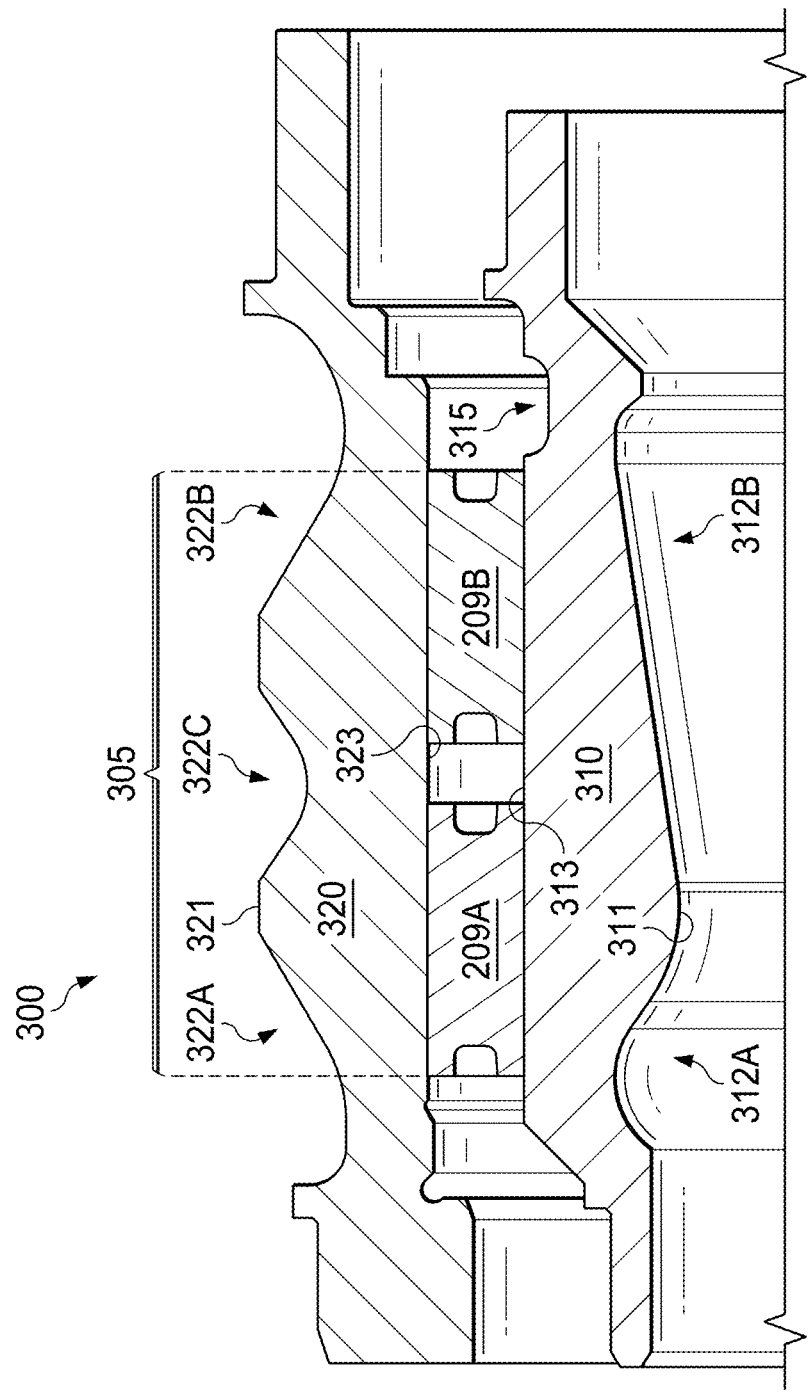

In some embodiments, the opposite surfaces 311 and/or 321 of the sprag clutch system 300 are contoured within the sprag contact region 305. In other words, the inner race 310 and/or the outer race 320 are formed having a profile shape that has a varying thickness within the sprag contact region 305. The profiles of the opposite surfaces 311 and 321 may be contoured to compensate for the extra stiffness contributed by regions of the inner race 310 and outer race 320 that are adjacent to (e.g., outside of) the sprag contact region 305. In this manner, controlling the shapes of the opposite surfaces 311 and 321 may control the stiffness profile of the inner race 310 and outer race 320 around the sprag clutch 201 to provide more uniform stiffness, which can result in more uniform radial deformation and thus can result in more uniform contact stress within the sprag contact region 205 during operation. In some cases, the use of contoured surfaces 311/321 as described herein can allow for a variation of mechanical stiffness across a sprag contact region 305 that is less than about 10%. In some embodiments, the surfaces of the opposite surfaces 311 and 321 outside of the sprag contact region 305 or outside of the race region 307 may be contoured to provide more uniform stiffness, as shown in FIG. 5. Inner races 310 and outer races 320 may have other profile shapes than shown in FIG. 5, and some additional non-limiting examples are illustrated in FIGS. 7A-7C.

As an example, the inner race 310 shown in FIG. 5 comprises an opposite surface 311 that has stiffness compensation regions 312A and 312B near the edges of the sprag contact region 305. As shown in FIG. 5, the opposite surface 311 comprises a substantially flat surface within the sprag contact region 305 that is sandwiched between stiffness compensation regions 312A-B having contoured (e.g., sloped or curved) surfaces. The stiffness compensation regions 312A-B are portions of the inner race 310 within which the opposite surface 311 has been contoured to reduce the effect of the extra stiffness contributed by the rest of the inner race 310. Accordingly, the stiffness compensation regions 312A-B are also referred to as "contoured regions 312A-B" herein. In FIG. 5, the contoured regions 312A-B comprise regions in which the thickness of the inner race 310 is reduced from a greatest thickness near the center of the sprag contact region 305. Because the extra stiffness contribution is greatest near the edges of the sprag contact region 305, reducing the thickness of the inner race 310 near the edges of the sprag contact region 305 (e.g., in the contoured regions 312A-B) can compensate for the extra stiffness by correspondingly reducing the total stiffness in these regions. In other words, selectively thinning portions of the inner race 310 can make the stiffness of the inner race 310 more uniform in and around the sprag contact region 305, in accordance with some embodiments. The longitudinal lengths of the stiffness compensation regions 312A-B may be similar or different. The portions of stiffness compensation regions 312A-B may be within the sprag contact region 305, and thus may radially overlap the sprag clutch 201. In some embodiments, portions of the stiffness compensation regions 312A-B extend beyond the sprag contact region 305 and thus do not radially overlap the sprag clutch 201.

As shown in FIG. 5, the outer race 320 may also be formed having stiffness compensation regions 322A-B (e.g., contoured regions 322A-B). Similar to the inner race 310, the contoured regions 322A-B of the outer race 320 have a reduced thickness, which compensates for external stiffness to make the stiffness of the contoured regions 322A-B closer to that of the interior of the sprag contact region 305. In this manner, the radial deformation of the outer race 320 within the sprag contact region 305 may be more uniform, which can allow for more uniform contact stress within the sprag contact region 305. As shown in FIG. 5, the opposite surface 321 of the outer race 320 comprises a substantially flat surface within the sprag contact region 305 that is sandwiched between stiffness compensation regions 322A-B having contoured (e.g., sloped or curved) surfaces. The longitudinal lengths of the stiffness compensation regions 322A-B may be similar or different.

FIG. 5 also includes a graph 30 of contact stress within the sprag contact region 305. The solid lines in graph 30 represent the contact stress (arbitrary units) experienced by the inner race 310 of the sprag clutch system 300 of FIG. 5 that includes an inner race 310 and an outer race 320 with thinned (e.g., contoured) portions in the sprag contact region 305. The dashed lines in graph 30 represent the contact stress (arbitrary units) experienced by the inner race 210 of the sprag clutch system 200 of FIG. 4, in which the inner race 210 and the outer race 220 each have a substantially constant thickness in the sprag contact region 205. As shown in graph 30, the use of stiffness compensation regions as described herein can reduce overall contact stress and reduce the variation of contact stress. In some cases, the use of stiffness compensation regions as described herein can allow for a variation of contact stress across a sprag contact region 305 that is less than about 10%. The use of stiffness compensation regions can also reduce the maximum contact stress and reduce the occurrence of localized regions of high contact stress, as shown in graph 30.

Figure 6:
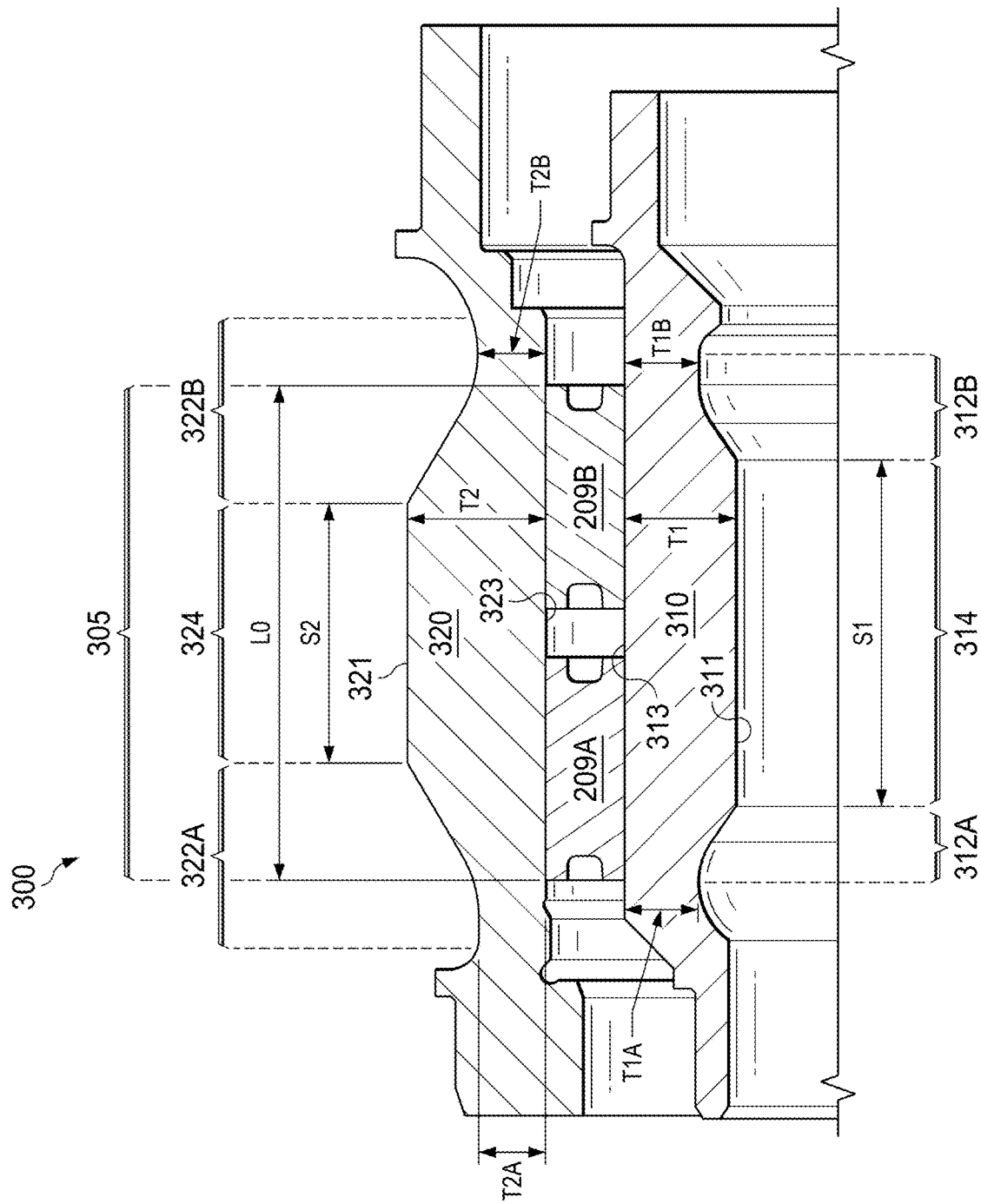
FIG. 6 illustrates a portion of a sprag clutch system, in accordance with some embodiments.

FIG. 6 illustrates the same sprag clutch system 300 shown previously in FIG. 5, with additional features labeled for discussion below. For example, the inner race 310 comprises stiffness compensation regions 312A-B and the outer race 320 comprises stiffness compensation regions 322A-B. The embodiment shown in FIGS. 5-6 is an illustrative example, and inner races and/or outer races that are contoured for stiffness compensation may have other shapes or configurations in other embodiments. As shown in FIG. 6, the sprag contact region 305 may have a length Lo that is the longitudinal distance across the sets 209A-B of sprags 206.

In some embodiments, the opposite surface 311 of the inner race 310 comprises a central region 314 of substantially constant thickness T1. The central region 314 may include a portion of the inner race 310 near the middle of the sprag contact region 305. Because the contact surface 313 is substantially flat, the opposite surface 311 in the central region 314 is also substantially flat. The flat surface of the central region 314 may have a length S1 that is between about 10% and about 90% of the length Wo, though other lengths are possible. A stiffness compensation region (e.g., contoured region 312A-B) may be present at one or both sides of the central region 314. The contoured regions 312A-B have a thickness that is less than T1. For example, the contoured region 312A has a thickness that varies from T1 within the sprag contact region 305 to a smaller thickness T1A at the edge of the sprag contact region 305, and the contoured region 312B has a thickness that varies from T1 within the sprag contact region 305 to a smaller thickness T1B outside of the sprag contact region 305. The minimum thickness of the inner race 310 within the contoured region 312A and/or 312B may be within the sprag contact region 305 or outside of the sprag contact region 305. In some cases, a minimum thickness of the inner race 310 within a contoured region 312A and/or 312B may be within the sprag contact region 305 or outside of the sprag contact region 305. Because the thickness is reduced in the contoured regions 312A-B, the contoured regions 312A-B may be considered thinned regions or recessed regions in some cases. In some embodiments, the thickness T1A or T1B may be between about 20% and about 90% of the thickness T1, though other thicknesses are possible. The thickness T1A may be greater than, less than, or about the same as the thickness T1B.

Because the contoured regions 312A-B are thinner than the central region 314, the opposite surface 311 within the contoured regions 312A-B is contoured, in some embodiments. For example, the opposite surface 311 within the contoured regions 312A-B may be curved, sloped, stepped, recessed, the like, a combination thereof, a piecewise combination thereof, or any other surface profile suitable to provide a desired stiffness compensation. In this manner, the inner race 310 may have a cross-sectional profile defined by the contouring of the opposite surface 311. Within the contoured regions 312A-B, the inner race 310 may have a recessed profile, a tapered profile, a concave profile, an irregular profile, the like, or any cross-sectional profile suitable to provide a desired stiffness compensation. In other embodiments, a portion of the contact surface 313 within a contoured region may also be contoured.

In this manner, the stiffness compensation regions 312A-B of the inner race 310 comprise relatively thinner portions of the inner race 310 within the sprag contact region 305, in some embodiments. In some cases, because the stiffness compensation regions 312A-B comprise relatively thinner portions of the inner race 310, the use of stiffness compensation regions 312A-B may reduce the weight of the inner race 310 (e.g., compared to an inner race without stiffness compensation regions). Reducing the weight by the use of stiffness compensation regions as described herein can allow for reduced fuel consumption, more efficient operation, and reduced cost. In some cases, an inner race comprising stiffness compensation regions may have between about 5% and about 20% less mass than an inner race without stiffness compensation regions, though other reductions in mass are possible.

The discussion above referred to the contouring (e.g., utilization of stiffness compensation regions) of the inner race 310, but the outer race 320 may also be contoured in some embodiments. For example, still referring to FIG. 6, the opposite surface 321 of the outer race 320 may comprise a central region 324 of substantially constant thickness T2. The thickness T2 may be greater than, less than, or about the same as the thickness T1. The flat surface of the central region 324 may have a length S2 that is between about 10% and about 90% of the length Wo, though other lengths are possible. A stiffness compensation region (e.g., contoured region 322A-B) may be present at one or both sides of the central region 324, and the contoured regions 322A-B have a thickness that is less than T2. For example, the contoured region 322A has a thickness that varies from T2 within the sprag contact region 305 to a smaller thickness T2A at the edge of the sprag contact region 305, and the contoured region 322B has a thickness that varies from T2 within the sprag contact region 305 to a smaller thickness T2B outside of the sprag contact region 305. The minimum thickness of the outer race 320 within the contoured region 322A and/or 322B may be within the sprag contact region 305 or outside of the sprag contact region 305. In some cases, a minimum thickness of the outer race 320 within the contoured region 322A and/or 322B may be within the race region 307 or outside of the race region 307. In some embodiments, the thickness T2A or T2B may be between about 20% and about 90% of the thickness T2, though other thicknesses are possible. The thickness T2A may be greater than, less than, or about the same as the thickness T2B.

Because the contoured regions 322A-B are thinner than the central region 324, the opposite surface 321 within the contoured regions 322A-B is contoured, in some embodiments. For example, the opposite surface 321 within the contoured regions 322A-B may be curved, sloped, stepped, recessed, the like, a combination thereof, a piecewise combination thereof, or any other surface profile suitable to provide a desired stiffness compensation. In other embodiments, a portion of the contact surface 323 within a contoured region may also be contoured.

In this manner, the stiffness compensation regions 322A-B of the outer race 320 comprise relatively thinner portions of the outer race 320 within the sprag contact region 305, in some embodiments. In some cases, an outer race comprising stiffness compensation regions may have between about 5% and about 20% less mass than an outer race without stiffness compensation regions, though other reductions in mass are possible. In some embodiments, it is the combination of the contouring of the inner race 310 and the contouring of the outer race 320 that together facilitate more uniform radial deformation and more uniform contact stress. In other embodiments, only the inner race 310 or only the outer race 320 is contoured.

The stiffness compensation regions 312A-B and 322A-B shown in FIGS. 5-6 are illustrative examples, and the inner race 310 and/or outer race 320 may have other surface profiles or cross-sectional profiles in other embodiments. The specific contouring of the stiffness compensation regions may depend on the particular application. For example, in some embodiments, the radial deformation of the inner race or outer race without stiffness compensation may be modeled or predicted, and then the characteristics (e.g., profile, location, length, thickness, etc.) of the stiffness compensation regions may be determined in order to provide suitably uniform radial deformation and/or contact stress during operation. Accordingly, the characteristics of the stiffness compensation region may be controlled to have any suitable form that provides the desired uniformity of radial deformation and/or contact stress. A stiffness compensation region may extend fully or partially across the sprag contact region. A stiffness compensation region may also extend any distance away from the sprag contact region. For example, referring to FIG. 5, a stiffness compensation region may extend to an adjacent bearing 250 or even beyond an adjacent bearing 250 in some embodiments. In some embodiments, the characteristics of a stiffness compensation region may be controlled to reduce radial deformation at or near a bearing 250, which can reduce wear, improve reliability, and improve operation of the bearing 250.

FIGS. 7A, 7B, and 7C illustrate example sprag clutch systems 300, in accordance with some embodiments. The sprag clutch systems 300 of FIGS. 7A-7C are similar to the sprag clutch system 300 of FIGS. 5-6, except that the stiffness compensation regions 312A-B and 322A-B have different characteristics. The sprag clutch systems 300 of FIGS. 7A-7C are intended as non-limiting examples for illustrative purposes, and sprag clutch systems or stiffness compensation regions having other configurations, characteristics, or arrangements are possible.

FIG. 7A illustrates a sprag clutch system 300 in which the opposite surfaces 311 and 321 are curved throughout, in accordance with some embodiments. In FIG. 7A, the inner race 310 and outer race 320 do not have substantially flat central regions 314 and 324 as shown in FIG. 6. The curvature of the stiffness compensation regions 312A, 312B, 322A, and/or 322B may be similar, different, symmetrical, or asymmetrical. In some embodiments, portions of the opposite surfaces 311 may have flat regions in addition to curved regions, and the flat regions may or may not be parallel to the contact surfaces 313 or 323. In some embodiments, the entire opposite surface 311 or 321 is contoured, and thus the inner race 310 or outer race 320 may be considered to have a single respective stiffness compensation region that extends fully across the sprag contact region 305.

FIG. 7B illustrates a sprag clutch system 300 in which the opposite surfaces 311 and 321 have stepped portions, in accordance with some embodiments. As shown in FIG. 7B, the contouring of the stiffness compensation regions may have stepped portions (e.g. as in 312A, 322A, and 322B) or may have linear portions (e.g., as in 312B), or may have a combination thereof. The stepped portions may have surfaces that are parallel to the inner surfaces 313 or 323, in some embodiments. In other embodiments, the stepped portions may be sloped or curved with respect to the contact surfaces 313 or 323.

FIG. 7C illustrates a sprag clutch system 300 having other arrangements of stiffness compensation regions, in accordance with some embodiments. In FIG. 7C, the inner race 310 comprises a stiffness compensation region 315 in which the contact surface 313 is contoured. A contact surface 313 or 323 may be contoured to provide suitable stiffness compensation. A contoured region (e.g., 315) of a contact surface 313 or 323 may extend at least partially into the race region 307, in some cases. FIG. 7C also illustrates the inner race 310 as having an asymmetric arrangement of stiffness compensation regions 312A-B, in which the stiffness compensation regions 312A-B have different lengths.

Still referring to FIG. 7C, the outer race 320 of the sprag clutch system 300 comprises three stiffness compensation regions 322A-C. In the embodiment of FIG. 7C, the stiffness compensation region 322C is separated from the stiffness compensation regions 322A and 322B by substantially flat regions of the opposite surface 321. In other embodiments, stiffness compensation regions may be separated by other surface profiles. In some cases, a stiffness compensation region may be a recess in an opposite surface 311 or 321, such as the stiffness compensation region 322C in the opposite surface 321. In other embodiments, the inner race 310 or outer race 320 may have one stiffness compensation region or may have more than three stiffness compensation regions.

FIG. 8 illustrates a cross-sectional view of an oil distribution tube 400 within a sprag clutch system 300, in accordance with some embodiments. The sprag clutch system 300 may be similar to the sprag clutch systems 300 described for FIGS. 5-7C, and the cross-sectional view of FIG. 8 is a longitudinal cross-section. For example, the longitudinal cross-section of FIG. 8 is along the longitudinal axis A (also see FIG. 2) and parallel to the cross-section X-X shown in FIG. 2. For example, the sprag clutch system 300 of FIG. 8 comprises an inner race 310 and an outer race 320 having stiffness compensation regions (not separately labeled). The inner race 310 comprises a plurality of apertures 330 that allow oil to be delivered from the interior of the inner race 310 to components exterior to the inner race 310, such as the sprag clutch 201, bearings 250, or other components. An oil delivery tube 450 is shown within the inner race 310 that provides oil to the sprag clutch system 300 through a plurality of apertures. The oil delivery tube 450 may be similar to those known in the art, in some cases.

Due to the contouring of the opposite surface 311 of the inner race 310, oil may collect in the contoured regions, which may reduce the efficiency of oil flow through the apertures 330. Accordingly, an oil distribution tube 400 may be utilized within the inner race 310 to facilitate oil flow, in accordance with some embodiments. The oil distribution tube 400 is a hollow cylindrical structure between the oil delivery tube 450 and the inner race 310. The oil distribution tube 400 surrounds the oil delivery tube 450 and may physically contact the oil delivery tube 450 and/or the inner race 310. The oil distribution tube 400 comprises a plurality of apertures 402 that facilitate the flow of oil from the oil delivery tube 450 to the apertures 330 of the inner race 310. In some embodiments, at least some of the apertures 402 may align with corresponding apertures 330 of the inner race 310. The interior sidewalls of the oil distribution tube 400 may have substantially flat surfaces such that oil is more evenly distributed into the apertures 402 and thus oil is more evenly distributed into the apertures 330. In this manner, oil may be more efficiently and evenly delivered through the apertures 330 when stiffness compensation regions are present.

The oil distribution tube 400 may be formed of any suitable material, such as plastic or metal. In some embodiments, the oil distribution tube 400 does not significantly affect the operation of the sprag clutch 201 or the radial deformation of the sprag clutch system 300. The oil distribution tube 400 shown in FIG. 8 is an example, and oil distribution tubes may have other shapes, arrangements, or configurations in other embodiments. For example, the shape of the oil distribution tube 400 or locations of the apertures 402 may depend on the contouring of the inner race 310, in some cases.

In an embodiment of the present disclosure, a structure includes an inner race configured to rotate about an axis, wherein the inner race has a first inner surface that faces the axis and a second inner surface that is opposite the first inner surface, wherein the first inner surface is sloped with respect to the axis and the second inner surface is parallel to the axis; an outer race surrounding the inner race and configured to rotate about the axis, wherein the outer race has a first outer surface that faces the axis and a second outer surface that is opposite the first outer surface, wherein the first outer surface is parallel to the axis and the second outer surface is sloped with respect to the axis; and a sprag clutch between the second inner surface and the first outer surface. In an embodiment, the inner race has a third inner surface that is opposite the second inner surface, wherein the third inner surface is parallel to the axis. In an embodiment, a thickness of the inner race along the third inner surface is greater than a thickness of the inner race along the first inner surface. In an embodiment, the first inner surface has a curved profile along a direction of the axis. In an embodiment, a first portion of the first inner surface radially overlaps the sprag clutch and a second portion of the first inner surface does not radially overlap the sprag clutch. In an embodiment, the sprag clutch is between the first inner surface and the second outer surface. In an embodiment, the structure includes an oil distribution tube between the inner race and the axis, wherein the oil distribution tube has apertures that align with corresponding apertures in the inner race.

In an embodiment of the present disclosure, a method includes rotating an outer shaft; and using a sprag clutch to couple the rotation of the outer shaft to an inner shaft, wherein a first thickness of the outer shaft at a first edge of a first sprag of the sprag clutch is different from a second thickness of the outer shaft at a second edge of the first sprag of the sprag clutch. In an embodiment, the second thickness is greater than the first thickness. In an embodiment, a third thickness of the inner shaft at the first edge of the first sprag of the sprag clutch is different from a fourth thickness of the inner shaft at the second edge of the first sprag of the sprag clutch. In an embodiment, the sprag clutch includes a second sprag, wherein a first edge of the second sprag is adjacent the second edge of the first sprag. In an embodiment, a fifth thickness of the outer shaft at the first edge of the second sprag of the sprag clutch is different from a sixth thickness of the outer shaft at a second edge of the second sprag of the sprag clutch.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
a drive shaft coupled to an engine;
a sprag clutch coupled to the drive shaft, wherein the sprag clutch comprises:
a plurality of first sprags distributed around a first retainer; and
a plurality of second sprags distributed around a second retainer; and
an inner race coupled to the sprag clutch, wherein the sprag clutch physically contacts a first contact surface of the inner race during operation, wherein a first cross-sectional thickness of the inner race near the middle of the first contact surface is greater than a second cross-sectional thickness of the inner race near a first edge of the first contact surface.

2. The rotorcraft of claim 1, wherein the first cross-sectional thickness of the inner race near the middle of the first contact surface is greater than a third cross-sectional thickness of the inner race near a second edge of the first contact surface that is opposite the first edge.

3. The rotorcraft of claim 1, wherein the sprag clutch physically contacts a second contact surface of the drive shaft during operation, wherein a fourth cross-sectional thickness of the drive shaft near the middle of the second contact surface is greater than a fifth cross-sectional thickness of the drive shaft near a first edge of the second contact surface.

4. The rotorcraft of claim 1, wherein a portion of the inner race that includes the middle of the first contact surface has a constant cross-sectional thickness.

5. The rotorcraft of claim 1, wherein the first contact surface is longitudinally flat, wherein a surface of the inner race opposite the first contact surface is longitudinally curved.

6. The rotorcraft of claim 1, wherein the longitudinal variation of mechanical stiffness across the first contact surface is less than 10%.

7. The rotorcraft of claim 1, wherein the second cross-sectional thickness is between 20% and 90% of the first cross-sectional thickness.

8. The rotorcraft of claim 1, wherein the portion of the inner race having the second cross-sectional thickness longitudinally overlaps the plurality of first sprags.

9. A structure, comprising:
an inner race configured to rotate about an axis, wherein the inner race comprises a first inner surface that faces the axis and a second inner surface that is opposite the first inner surface, wherein the first inner surface is sloped with respect to the axis and the second inner surface is parallel to the axis;
an outer race surrounding the inner race and configured to rotate about the axis, wherein the outer race comprises a first outer surface that faces the axis and a second outer surface that is opposite the first outer surface, wherein the first outer surface is parallel to the axis and the second outer surface is sloped with respect to the axis; and
a sprag clutch between the second inner surface and the first outer surface.

10. The structure of claim 9, wherein the inner race comprises a third inner surface that is opposite the second inner surface, wherein the third inner surface is parallel to the axis.

11. The structure of claim 10, wherein a thickness of the inner race along the third inner surface is greater than a thickness of the inner race along the first inner surface.

12. The structure of claim 9, wherein the first inner surface has a curved profile along a direction of the axis.

13. The structure of claim 9, wherein a first portion of the first inner surface radially overlaps the sprag clutch and a second portion of the first inner surface does not radially overlap the sprag clutch.

14. The structure of claim 9, wherein the sprag clutch is between the first inner surface and the second outer surface.

15. The structure of claim 9 further comprising an oil distribution tube between the inner race and the axis, wherein the oil distribution tube comprises a plurality of apertures that align with corresponding apertures in the inner race.

16. A method comprising:
rotating an outer race; and
using a sprag clutch to couple the rotation of the outer race to an inner race, wherein the sprag clutch comprises a plurality of first sprags distributed around a first retainer; and a plurality of second sprags distributed around a second retainer; wherein a first thickness of the outer race at a first edge of the first sprags of the sprag clutch is different from a second thickness of the outer race at a second edge of the first sprags of the sprag clutch, wherein a first edge of the second sprags is adjacent the second edge of the first sprags, wherein a third thickness of the outer race at the first edge of the second sprags of the sprag clutch is different from a fourth thickness of the outer race at a second edge of the second sprags of the sprag clutch.

17. The method of claim 16, wherein the second thickness is greater than the first thickness.

18. The method of claim 16, wherein a fifth thickness of the inner race at the first edge of the first sprags of the sprag clutch is different from a sixth thickness of the inner race at the second edge of the first sprags of the sprag clutch.

19. The method of claim 16, wherein the second thickness and the third thickness are the same thickness.

20. The method of claim 16, wherein the first thickens and the fourth thickness are different thicknesses.

\* \* \* \* \*